Figure 1:
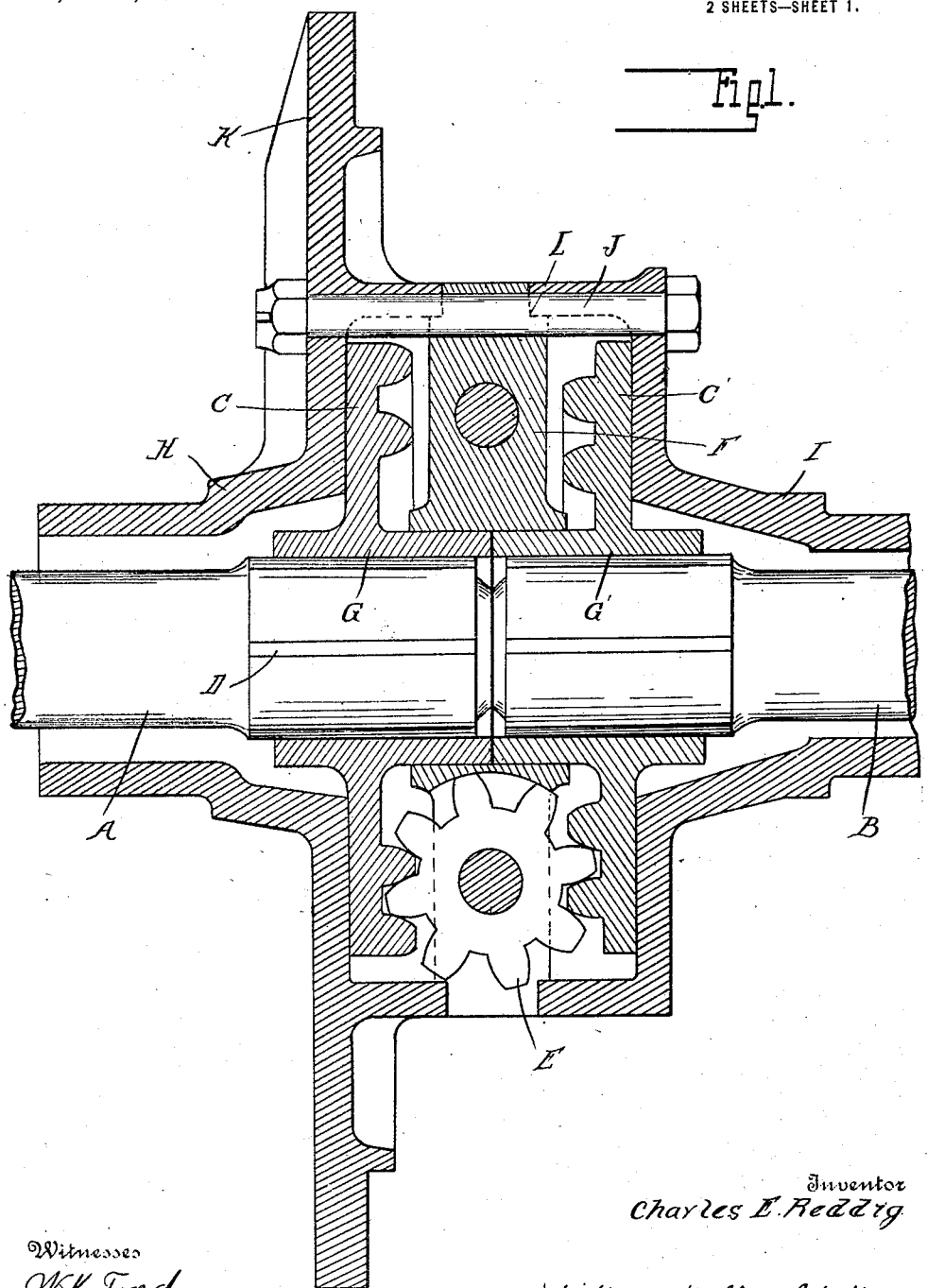

C. E. REDDIG.
DIFFERENTIAL GEARING.
APPLICATION FILED FEB. 18, 1915.

1,213,258.

Patented Jan. 23, 1917.
2 SHEETS—SHEET 1.

Witnesses
W. K. Ford
James P. Berry

Inventor
Charles E. Reddig

By Whittemore Hulbert & Whittemore
Attorneys

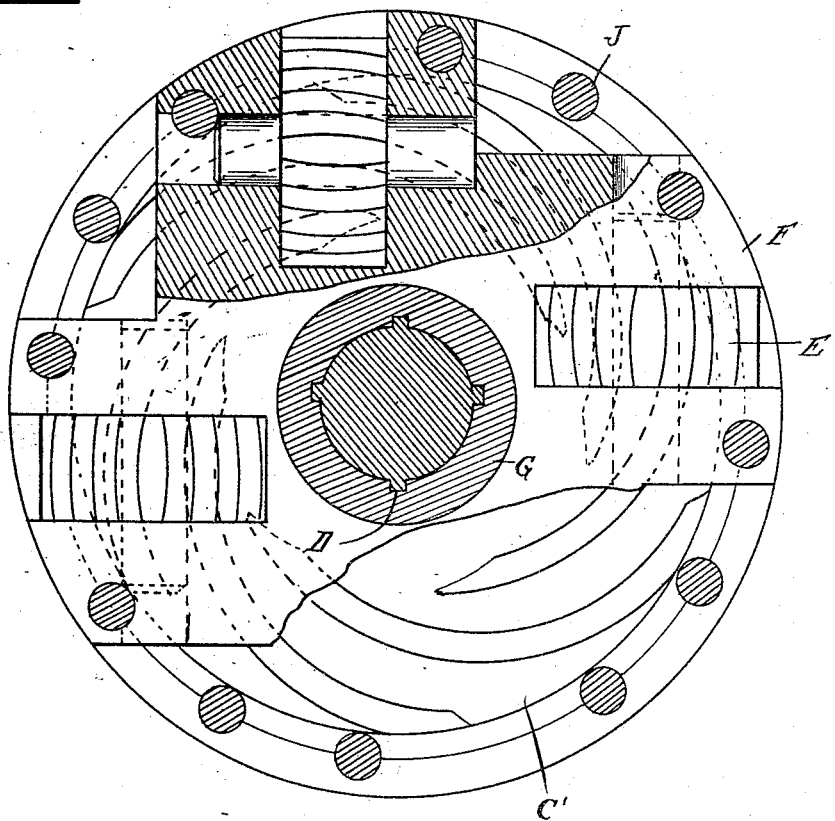

UNITED STATES PATENT OFFICE.

CHARLES E. REDDIG, OF DETROIT, MICHIGAN.

DIFFERENTIAL GEARING.

1,213,258.  Specification of Letters Patent.  Patented Jan. 23, 1917.

Application filed February 18, 1915. Serial No. 9,027.

*To all whom it may concern:*

Be it known that I, CHARLES E. REDDIG, a citizen of the United States of America, residing at Detroit, in the county of Wayne and State of Michigan, have invented certain new and useful Improvements in Differential Gearing, of which the following is a specification, reference being had therein to the accompanying drawings.

The invention relates to differential gearing of that type in which a differential rotation of the two wheels is permitted without losing the driving force of either wheel. It is the object of the invention to obtain a construction which is easy to manufacture and which possesses certain advantageous features as hereinafter set forth.

In the drawings: Figure 1 is a longitudinal section; and Fig. 2 is an elevation of one of the spiral disk gears with the coöperating gears in engagement therewith.

A and B are the alined sections of the drive axle, and C and C' are spiral disk gears mounted on said axle sections and having splines D or other driving engagement therewith. The disks C and C' are spaced from each other for the arrangement therebetween of a series of coöperating spiral gears E revolubly mounted in a spider frame F, journaled upon the adjacent hubs G G' of the disks C C'. The spider frame F is secured to members H and I upon opposite sides thereof by bolts J, said members H and I forming a housing for the gearing, and the member H being provided with a flange K forming the driving wheel.

With the construction as thus far described in operation, the spiral disk gears C and C' and intermediate gears E together constitute an irreversible gearing, in which neither of the disk gears can be driven by the rotation of an intermediate gear about its own axis. On the other hand, where there is a differential rotation of the disk gears the intermediate spiral gears will be freely revolved, causing a planetary movement thereof and the spider frame in which they are journaled about the axis of the disks. Thus where the driving force is transmitted solely through the wheel K the gearing will remain interlocked and both axle sections will be driven equally without regard to the load upon the respective ground wheels. On the other hand, where, as in the turning of a corner, one of the ground wheels must revolve faster than the other, the accelerated movement of the outer wheel is permitted and results in the accelerated rotation of the intermediate gears and their planetary movement about the axis of the slower-moving disk gear. During this movement the driving force exerted upon the slower-moving disk gear is not released, nor is the driving force upon the accelerated disk gear released. Both gears are driven equally as before, but in addition to the drive from the wheel K the accelerated disk is further driven from the axle section on which it is mounted.

It will be noted that as the spiral disk gears are right and left and engage with the spiral teeth on opposite sides of the intermediate gears, the latter must be adapted for this reverse engagement. Thus the form of the tooth on the intermediate gear is double convex, and to arrange these teeth more nearly in parallelism with the axis of the gear said gear is offset in relation to the axis of the disk gear, as shown in Fig. 2. This also permits of using a steeper pitch for the thread of the disk gear, but not so steep as to be without the angle of friction. Another result is that a larger number of threads of the disk gear are simultaneously in engagement with the teeth of the intermediate gears.

The members H I and F are securely fastened to each other by the bolts J, and are preferably provided with a shouldered engagement at L to insure proper alinement. Together these members form a housing for the gears C C' and E, and the members H and I also form thrust bearings for the outer faces of the gears C and C'. The whole construction is one which may be easily manufactured and assembled.

What I claim as my invention is:—

1. A differential gearing, comprising a pair of spaced axially alined spiral disk gears adapted for mounting on the respective axle sections, the threads of said gears being respectively right and left, intermediate gears mounted between said spiral gears adapted for engagement with said disk gears, and a mounting for said intermediate gears adapted for planetary movement about the axis of said disk gears.

2. A differential gearing, comprising a pair of spaced axially alined spiral disk gears having their threads respectively right and left and of the same pitch, intermediate gears mounted between said spiral gears engaging said disk gears, the pitch of the threads being such as to prevent the driving of either disk from the intermediate gear, a drive member revoluble about the axis of said disk gears, and a mounting for said intermediate gears upon said drive member.

3. A differential gearing, comprising alined abutting axle sections, a pair of spiral disk gears mounted on the respective sections and spaced from each other, the threads of said gears being oppositely arranged and respectively right and left, a member arranged intermediate said gears and journaled for independent rotary movement thereon, and intermediate gears mounted on said member and engaging the opposite disk gears, said engagement permitting the rotation of said intermediate gears by either one of said disk gears and being irreversible.

4. A differential gearing, comprising a pair of axially alined spaced spiral disk gears having abutting hub portions, the threads of said gears being respectively right and left, a member journaled upon the hubs of said gears intermediate the disks, intermediate gears mounted on said member and engaging said disk gears so as to be revoluble by either of said disks the movement being irreversible, and a housing for said gearing connected to said intermediate member and forming a drive member therefor.

5. A differential gearing, comprising a pair of spaced axially alined spiral disk gears having their threads oppositely arranged and respectively right and left, a plurality of intermediate gears arranged in planes offset from the axis of said disk gears to bring the teeth of said intermediate gears more nearly in parallelism with the axes thereof, and a mount for said intermediate gears adapted for planetary movement about the axis of said disk gears.

6. A differential gearing, comprising oppositely arranged spiral disk gears for mounting on the respective axle sections, said gears having inwardly extending hubs, a spider mounted between the gears upon said hubs, a plurality of intermediate gears mounted upon said spider, and having an irreversible engagement with said disk gears, a pair of members forming a casing inclosing said gears and spider, said members forming thrust bearings for the spiral disk gears and means rigidly connecting said casing members and spider.

In testimony whereof I affix my signature in presence of two witnesses.

CHARLES E. REDDIG.

Witnesses:
JAMES P. BARRY,
PHYLLIS COBUIN.

Copies of this patent may be obtained for five cents each, by addressing the "Commissioner of Patents, Washington, D. C."